March 6, 1945.  J. F. HARKOM  2,370,956
APPARATUS FOR PRODUCING BONDED STRUCTURES
Filed Dec. 14, 1942

Inventor:
John F. Harkom
By Alex. H. MacRae
Attorney.

Patented Mar. 6, 1945

2,370,956

UNITED STATES PATENT OFFICE 2,370,956

APPARATUS FOR PRODUCING BONDED STRUCTURES

John Frederick Harkom, Ottawa, Ontario, Canada, assignor to His Majesty the King in the right of Canada, as represented by the Minister of Mines and Resources Application December 14, 1942, Serial No. 469,019
In Canada December 7, 1942

9 Claims. (Cl. 144—281)

This invention relates to a method and apparatus for producing bonded structures of fibrous material, such as wood, paper and the like.

In the art of forming molded or laminated structures such as plywood and irregular shapes thereof, it is usual to employ a pressure chamber including a fluid-tight flexible container, usually of rubber, in which the laminations and shapes, in assembled and adhesively treated condition, are placed for subjection to heat and pressure in order to produce a unified structure. The rubber container functions, as is well known in the art, to provide a flexible pressure bearing member which is adapted to follow the contour of the element under treatment. As is well known in the art, the life of such rubber containers is relatively short due to the heat to which they are necessarily subjected during the treatment. Thus, it is estimated that, in the production of curved plywood fuselage sheets for aircraft, many tons of new crude rubber is required annually for the formation of such sheets.

Furthermore, there are many types of irregular and complicated shapes involving the use of, for instance, bracing members, which it is impossible to form in an ordinary press or rubber container since the press or container cannot be made to conform to the contour of the article to be formed.

In the molding of compregnated fibrous shapes, which comprise veneer or like laminations impregnated with a synthetic resin such as phenol formaldehyde resin, the high temperatures to which such shapes are subjected to produce the desired intimate bond between the laminations are destructive to rubber and thus the use of such a container is impractical.

It is an object of the present invention to provide a method and means for forming bonded structures involving the employment of a pressure applying medium which readily adapts itself to all structural shapes, whether or not of complicated nature, and which is substantially unaffected by heat.

Figure 1:
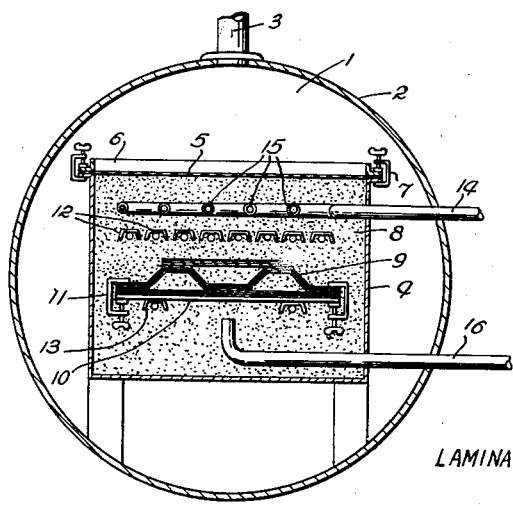
Figure 3:
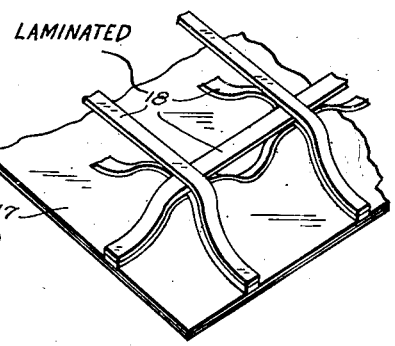
Figure 2:
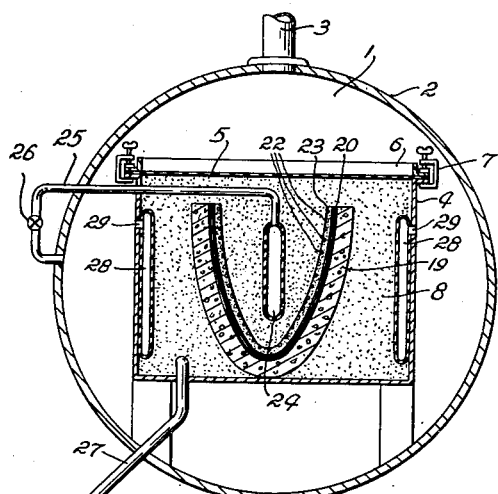
Figure 4:
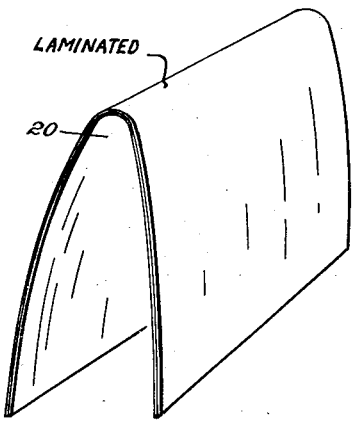
Figure 5:
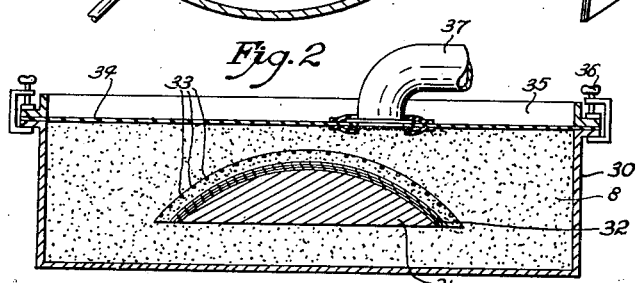

Other objects and advantages of the invention will appear from the following description, with particular reference to the accompanying drawing, in which Figure 1 is a sectional elevation of one form of apparatus for carrying out the invention, Figure 2 is a sectional elevation of an alternative form of apparatus, Figures 3 and 4 are perspective views of representative plywood structures which may be produced in accordance with the invention, and Figure 5 is a sectional elevation of another form of apparatus.

Referring to Figure 1, 1 is a pressure chamber consisting of a cylindrical container 2 of steel, wood staves or other suitable material and adapted to receive air or other fluid under pressure through inlet 3. Mounted within the chamber is a tank 4, the open top of which is closed by a fluid-tight flexible diaphragm 5, of rubber or other flexible material, a clamping frame 6 and clamps 7 being provided to hold it firmly but removably in place. The tank is vented to the atmosphere by means of a pipe 16.

The tank 4 is adapted to receive a readily flowable granular solid material such as sand 8, and embedded in the sand, the structure to be treated, as indicated at 9. The structure is preferably mounted on a supporting member, such as a steel sheet 10, to which it may be secured as by clamps 11.

Means for supplying heat to the structure comprises a plurality of strip heaters 12, of the high resistance electrical type, spaced somewhat above the structure, and a pair of such heaters 13 positioned immediately below the sheet 10.

In order to induce convection currents in the sand and to increase the rate of heat flow from the upper heaters, air may be introduced into the upper portion of the tank through an inlet pipe 14 having a plurality of outlets 15. The air is led from the bottom portion of the tank by the pipe 16.

In operation, the structure to be produced is provided with the necessary adhesive and assembled in the usual manner. It is then mounted on the plate 10. The flowable medium, such as sand, the mounted structure, and the various strip heaters are then placed in the tank in conjunction with one another whereby the structure and heaters are embedded and supported in the medium in approximately the positions illustrated. The tank being filled with the sand, the diaphragm 5 is secured in place.

Air pressure in the cylinder is now raised to the desired amount and the temperature in the tank raised to the desired degree by the electric strip heaters. The fluid pressure in the cylinder is transmitted to the sand through the flexible diaphragm 5, and owing to the readily flowable nature of the sand, the desired pressure is exerted on all surfaces of the structure by the sand.

The necessary and uniform heating of the structure during treatment is effectively accomplished by the provision of air currents supplied by pipe 14, in conjunction with the heaters. The heating may be accomplished or augmented by supplying preheated air through pipe 14 to the tank.

In a specific processing treatment, the air pressure in the cylinder was raised to 120 pounds per square inch in one and a half hours and the temperature was raised by the electric heaters to 230° F. in the same time. A pressure of three pounds per square inch was maintained in the pipe 14 supplying air to the tank.

Figure 3 illustrates a type of reinforced panel which may be effectively produced in the manner described. As shown, the panel comprises a laminated base 17 having a reinforcing bridging and strapping laminated structure 18 applied to one side of the same. The laminated bridging and strapping members are adhesively bonded together at their points of contact and to the panel. Tests have shown that by the addition of such a reinforcing structure to a laminated panel, its resistance to bending may be increased about two and a half times while its weight is increased approximately 50% by such addition. Heretofore, however, the gluing of such a relatively complicated structure would present many practical difficulties. By utilizing as the pressure medium a readily flowable solid material which flows into contact with the entire surface of the structure, these difficulties are avoided.

The embodiment illustrated in Figure 2 also includes the pressure chamber 1 and tank 4 with flexible diaphragm 5. In this form, however, a mold 19 of concrete or other suitable material is provided to receive the shape 20, which, as shown in Figures 2 and 4, may comprise a curved laminated sheet such as one suitable for use in the fabrication of the leading edge of an aircraft wing. Instead of the high resistance strip heaters employed in the form shown in Figure 1, the heating means comprises a grid consisting of a multiplicity of low electrical resistance wires 22 supported in a frame 23. The grid is adapted to extend over the entire inner surface of the shape in close proximity therewith. Such a grid provides a uniform distribution of heat over the surface of the structure, the wires being of such low resistance and heat output that no injury to the treated structure occurs by reason of the proximity of the wires thereto. Thus the necessity of diffusing heat from a concentrated source over a relatively large surface is avoided. It will be observed that the wires are embedded in the sand 8, there being a thin layer of sand between the grid and the shape. The sand provides adequate insulation for the low resistance wires.

In order to transmit greater pressure through the sand to the shape, a flexible tube 24 of, for instance, rubber, is provided in the mold and is adapted to be provided with air under pressure from the cylinder by means of the conduit 25 having a valve 26 for regulating the air flow therein. The sand insulates the tube from the heat. An air outlet pipe 27 is provided.

In order to provide pressure on the sand from a horizontal as well as a vertical direction by means of diaphragm 5, the sides of the tank are provided with flexible linings or bags 28 having inlets 29 communicating with the air under pressure in the cylinder.

The operating steps in this form of the device will be apparent from the foregoing description. In a specific processing treatment utilizing the apparatus of Figure 2 the air pressure in the cylinder was raised to 140 pounds per square inch and the temperature was then raised to 250° F. in forty minutes.

Referring to Figure 5, a shallow tank 30 receives the sand 8 and embedded therein is a mold or mandrel 31 having a shaped structure 32 thereon. A heating means comprising a grid of low resistance wires 33 extending in slightly spaced relation over the upper surface of the shape is provided. The tank is closed by a flexible diaphragm 34 secured thereto by frame 35 and clamps 36. A conduit 37 communicates with the interior of the tank. In operation, with the parts assembled as illustrated, the tank is subjected to vacuum by means of the conduit 37 whereby an atmospheric pressure of, say, 10 to 12 pounds per square inch is exerted on the diaphragm. The heater provides the temperature necessary for the particular adhesive used and the sand or other flowable material insulates the flexible diaphragm from the heat which is intimately applied to the structure being molded.

It will be apparent that the heating arrangement, and air admitting means of one form, may be substituted for that of the other, and that the horizontal pressure applying means 28 of the form shown in Figure 2 may be employed in the forms shown in Figures 1 and 5. In applying the means 28 to the structure of Figure 5, the opening 29 would, of course, be placed in communication with a source of air under pressure.

It will be observed that the invention makes it possible to use any desired temperature because of the insulation afforded by the sand in protecting the relatively small portion of flexible material which may be used for exerting the desired pressure on the shaped structure. This is of particular significance in molding shapes from compregnated fibrous material.

It will be apparent that various changes in the structural details described may be made without departing from the spirit and scope of the invention.

While sand is a readily available and satisfactory pressure medium, other materials composed of smooth granules may be used to provide the readily flowable pressure medium.

Moreover, while pressure on the flowable solid material has been described as being exerted by means of a flexible diaphragm under the influence of air pressure, it will be apparent that mechanical means, such as a ram, may be used to apply pressure to at least a portion of the surface area of the body of flowable solid material.

While the article-holding chamber has been shown as partially constructed of rigid and fixed walls, it is apparent that a wholly or partially flexible container or any modification thereof may be employed to enclose the article and the flowable pressure medium surrounding the article.

The means for supplying heat may be copper or like tubing through which a hot fluid circulates. This affords an easy means of regulating the temperature within the flowable material.

I claim:

1. Apparatus for forming bonded structures comprising means forming a fluid pressure chamber, an open top tank in said chamber having a body of readily flowable granular solid material therein and adapted to receive a structure to be bonded embedded in said body, a row of electrical heating elements embedded in said body, an air pressure conduit having a plurality of outlets in said body above the heating elements, an air discharge conduit having an inlet in said body below the heating elements, and a flexible diaphragm closing the open top of said tank.

2. Apparatus for forming bonded structures comprising means forming a fluid pressure chamber, an open top tank in said chamber having a body of readily flowable granular solid material therein and adapted to receive a structure to be bonded embedded in said body, a flexible diaphragm closing the open top of said tank and in contact with a surface portion of said body, and at least one flexible casing supported on the inner side surface of said tank and having communication with said chamber, said casing having contact with said body of material.

3. Apparatus for forming shaped bonded structures comprising means forming a fluid pressure chamber, an open top container in said chamber having a body of readily flowable granular solid material therein, a mold containing the shaped structure embedded in said body, heating elements also embedded in said body and located within the mold in proximity to the surface of the contained structure, at least one flexible sack embedded in said body, means for supplying air under pressure to said sack, and a flexible diaphragm closing the open top of said container and in contact with a surface portion of said body.

4. Apparatus for forming bonded structures comprising a container having a body of readily flowable granular solid material therein and adapted to receive a structure to be bonded embedded in said material, heating means also embedded in said material, means for causing heated air currents rising from said heating means to flow through said body and heat the structure embedded therein comprising an air conduit extending into said body and having an air outlet in the body at one side of the embedded structure and a second air conduit extending into said body and having an air inlet in the body at the other side of the embedded structure, and means for applying pressure to at least a portion of the surface area of said body.

5. Apparatus for forming bonded structures comprising a container having a body of readily flowable granular solid material therein and adapted to receive a structure to be bonded embedded in said body, and flexible diaphragm means supported by the wall of said container for applying pressure from at least two directions on the outer surface area of said body.

6. Apparatus for forming bonded structures comprising a container having a body of readily flowable solid granular material therein and adapted to receive a structure to be bonded embedded in said body, flexible diaphragm means supported by the wall of the container and bearing on the top surface and at least one side surface of said body, and means for applying pressure on said surfaces through said diaphragm means.

7. Apparatus for forming bonded structures comprising an open top tank having a body of readily flowable granular solid material therein and adapted to receive a structure to be bonded and embedded in said body, flexible diaphragm means closing the open top of the tank and in contact with a surface portion of said body, and flexible diaphragm means supported on the inner side surface of said tank and in contact with another surface portion of said body, and means for exerting pressure on said surface portions through said diaphragm means.

8. Apparatus for forming bonded structures comprising a support, a body of readily flowable granular solid material carried on said support and adapted to receive a structure to be bonded embedded therein, means for inducing heat currents in said body to heat said structure, flexible diaphragm means in contact with the top and at least one side surface of said body, and means for applying fluid pressure to said diaphragm means.

9. Apparatus for forming bonded structures comprising a support, a body of readily flowable granular solid material carried on said support and adapted to receive a structure to be bonded embedded therein, means for inducing heat currents in said body to heat said structure, flexible diaphragm means in contact with the top and at least one side surface of said body, and means for producing a reducing pressure within said body to cause deformation of said diaphragm means under the influence of atmospheric pressure.

JOHN FREDERICK HARKOM.